Jan. 8, 1935.  R. C. MOORE  1,987,409
WET SAW
Filed Dec. 26, 1930  3 Sheets-Sheet 1

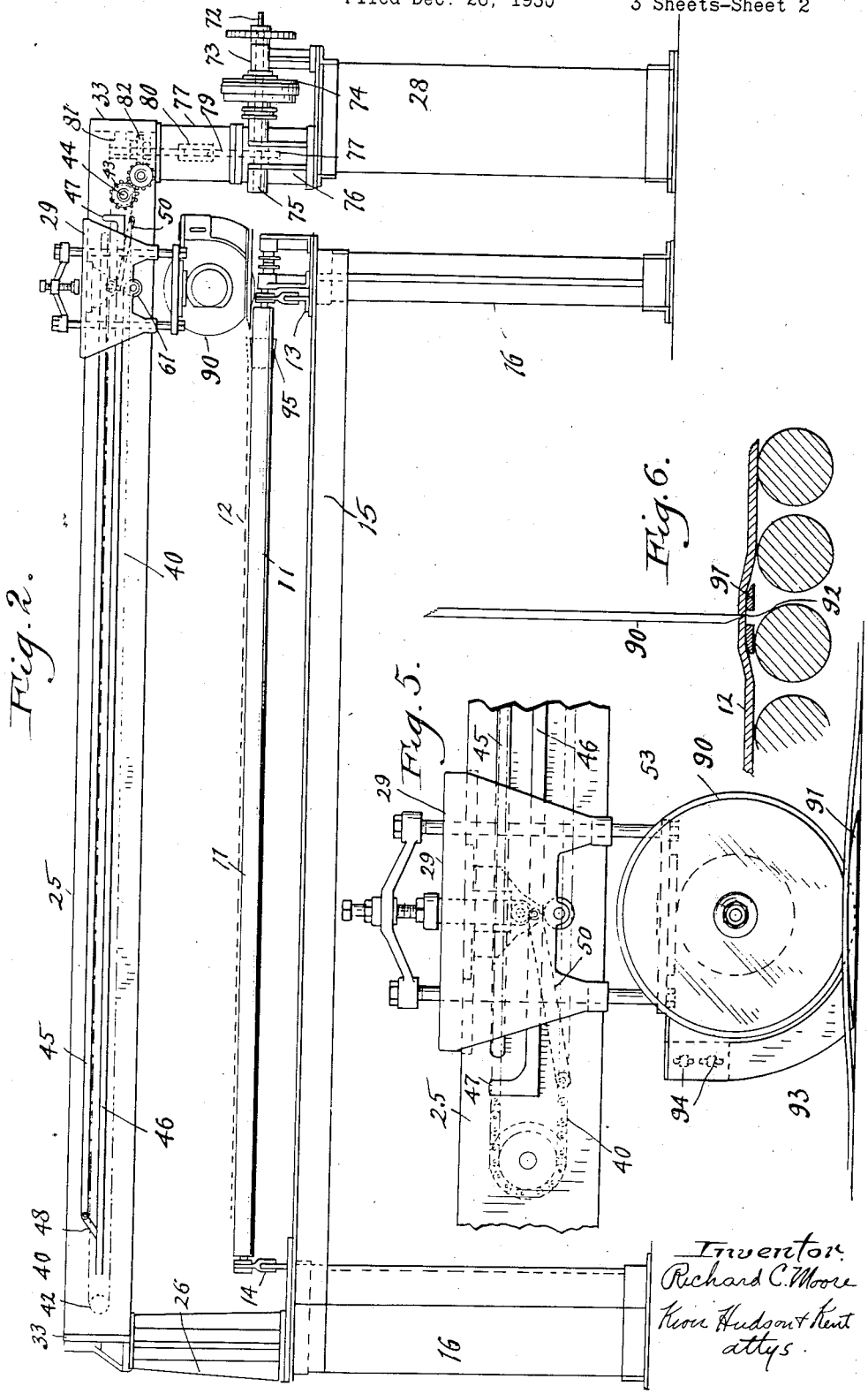

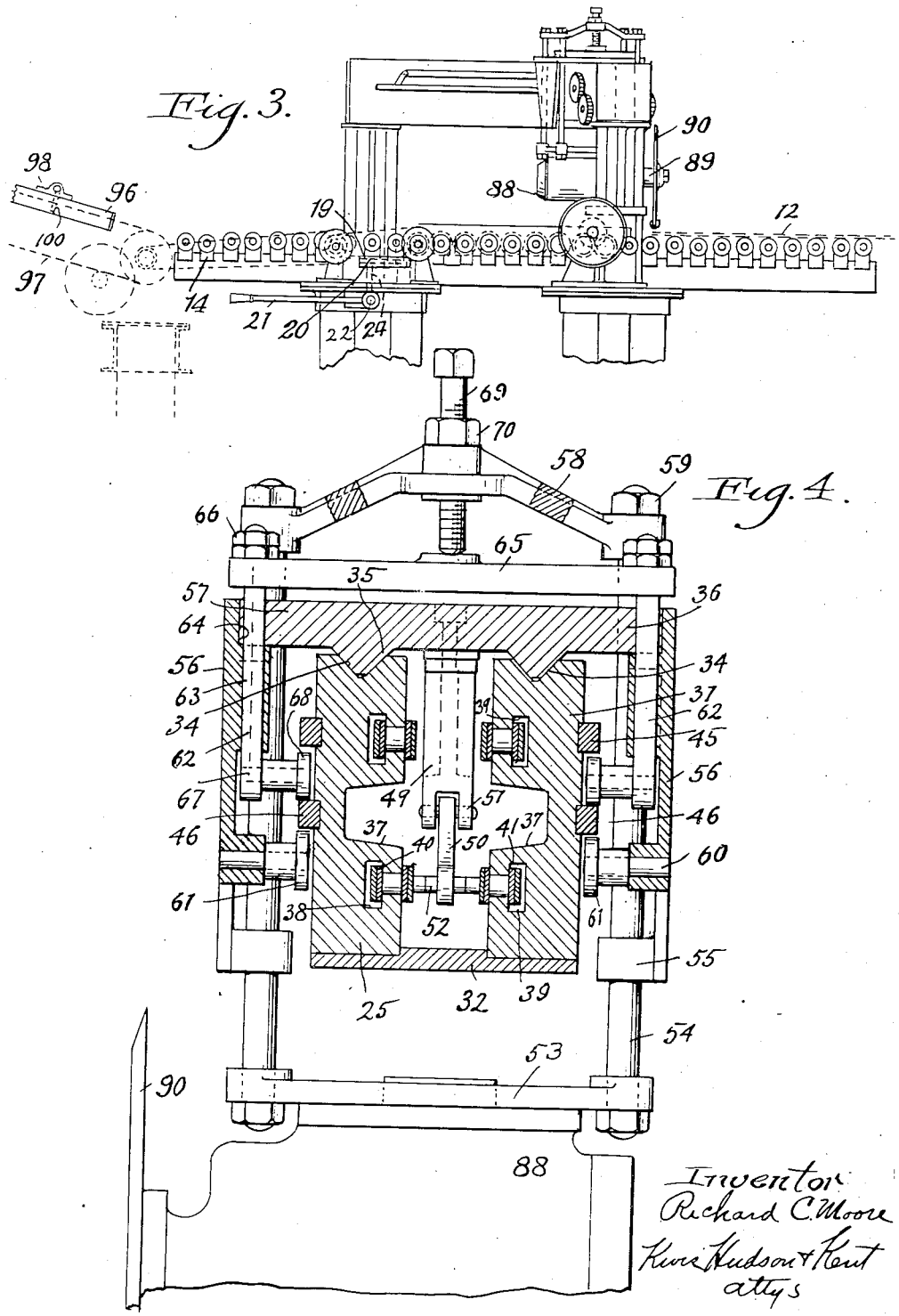

Patented Jan. 8, 1935

1,987,409

UNITED STATES PATENT OFFICE 1,987,409

WET SAW

Richard C. Moore, Painesville, Ohio, assignor to The Coe Manufacturing Company, Painesville, Ohio, a corporation of Ohio Application December 26, 1930, Serial No. 504,867

13 Claims. (Cl. 164—76)

This invention relates to a cutting device and more particularly to what is known as a wet saw.

Wet saws are used principally for cutting into predetermined lengths wet sheet material such as plaster board, insulation board or the like as it is discharged from a cylinder machine or a Fourdrinier machine in a continuous sheet. It is desirable to cut this material into lengths so that it can subsequently, conveniently be dried in a multiple deck drier as distinguished from a single drier for the continuous sheet.

It is further desirable to cut the wet sheet material into lengths while the material is moving and it is therefore one of the objects of the present invention to provide an improved wet saw which is comparatively simple in construction, efficient in operation and inexpensive to manufacture.

Another object of the invention resides in the fact that the speed of the saw in its movement diagonally across the wet sheet material is proportional to the rate of speed at which the material is fed so as to effect a transverse cut substantially at right angles to the edges of the material.

A further object of the invention is to provide an improved means for controlling the movement and operation of the saw.

Another object of the invention is to provide means located between the saw and the discharge end of the saw table to receive lengths of board the formation of which is imperfect, to thereby prevent these imperfect lengths from running into the drier without in any manner interfering with the operation of the saw.

With the objects above indicated and other objects hereinafter explained in view, the invention consists in the construction and combination of elements hereinafter described and claimed.

Referring to the drawings;

Fig. 2 is a front elevational view of the same.

Fig. 3 is a side elevational view of the same.

Fig. 4 is an enlarged transverse sectional view taken through the beam and carriage.

Fig. 5 is an enlarged side elevational view of the saw carriage and a fragmentary portion of the beam.

Fig. 6 is an enlarged diagrammatic view showing the relationship between the rollers and sheet material during the cutting operation.

Figure 1:
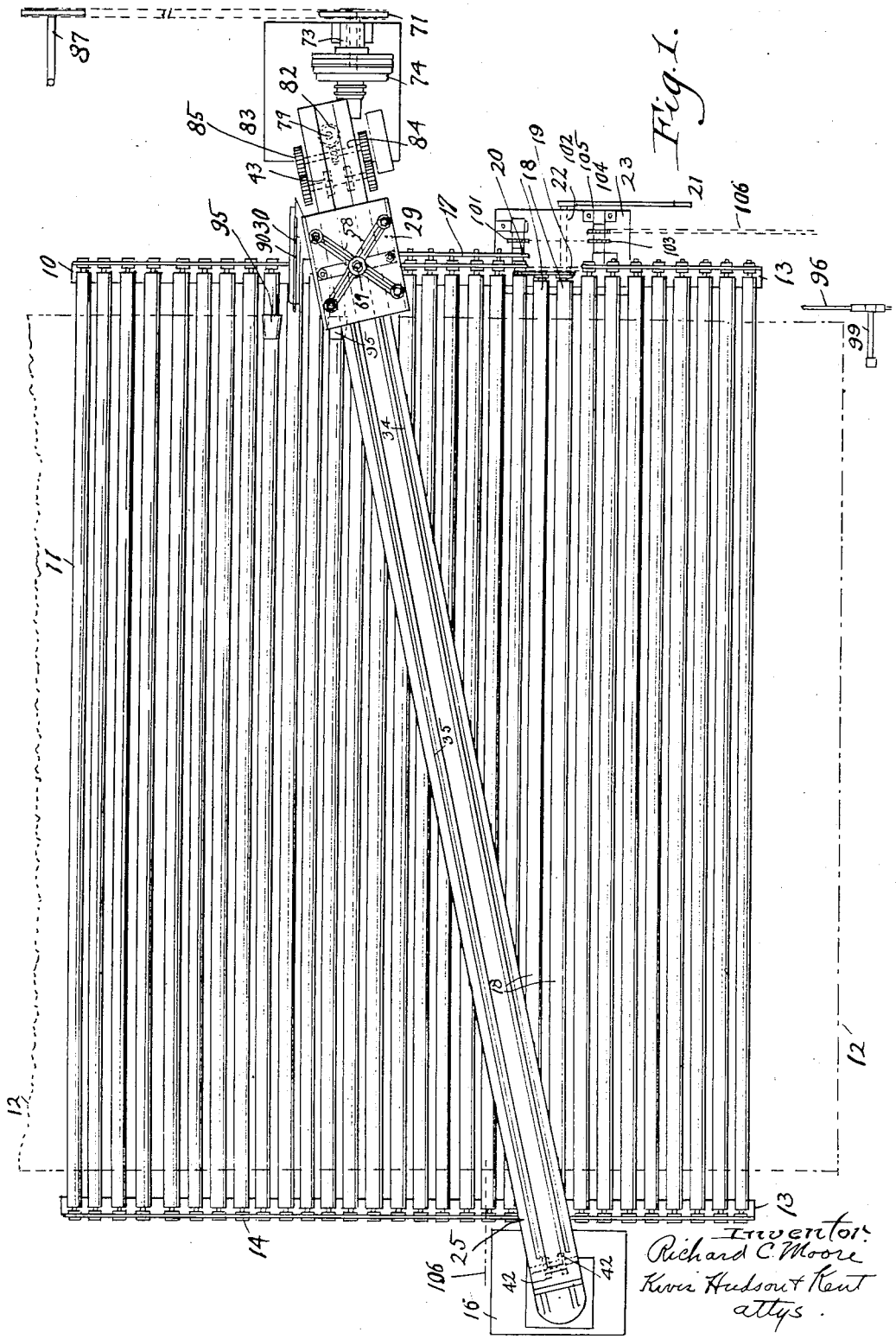
Figure 1 is a top plan view of a wet saw apparatus involving the present invention.

In the drawings 10 represents generally a wet saw table which comprises a plurality of conveyor rollers 11 extending longitudinally in spaced relation and in substantially a horizontal plane upon which the wall board or like material, indicated by dotted lines at 12, is adapted to travel in the direction indicated by the arrow. These rollers 11 may be of any desired length depending upon the width of the material to be conveyed thereon and of any suitable material, but preferably metal tubing. Extending longitudinally along the opposite ends of the rollers 11 are angles 13 which have one of their legs extending upwardly upon which are mounted a plurality of bearing brackets 14 within which the ends of the rollers 11 are journaled. The angle members 13 are held in spaced relation by transversely extending connecting members 15 rigidly attached thereto to provide a suitable frame. One of these connecting members 15 is shown in Fig. 2 but it should be understood that any number may be employed depending upon the necessary rigidity. This frame may be supported in any suitable manner as by supporting members 16, clearly shown in Fig. 2, upon which the frame is adapted to rest and to which it is rigidly bolted or otherwise secured.

Certain of the rollers 11 are provided with sprockets and driven by means of a chain 17 for a purpose to be later more fully described.

Two of the rollers 11 adjacent the discharge end indicated by 18 are not mounted upon the angles 13 but have their ends terminating somewhat short of the upstanding legs and have their ends journaled in brackets 19 similar to the brackets 14 which are secured upon strap iron members 20 disposed immediately inside of the upstanding legs of the angles 13. These strap iron members 20 have their rear ends provided with openings through which the journals of the adjacent rollers extend to thereby pivotally support the two rollers 18 for movement about the axis of the journal to which they are connected. A hand lever 21 has one end secured to a rod 22 which is mounted for movement about an axis upon the under side of a plate 23 supported at the top of the supporting member 16 while the opposite end of the rod 22 is provided with a laterally extending finger 24 adapted to cooperate with the strap member 20 and in its normal position as shown in Fig. 3 maintains the two rollers 18 in alignment in the same plane as the rollers 11. By movement of the lever 21 in a counterclockwise direction about the axis of the rod 22 causing these two rollers 18 may be moved out of alignment with the rollers 11 for a purpose to be later more fully described.

Extending diagonally across the saw table is a beam 25 which is supported at its ends by uprights 26 and 27 in turn supported by and secured to one of the supporting members 16 and a beam support 28 respectively. This beam 25 is rigidly supported in spaced parallel relation with respect to the rollers 11 and is disposed at a predeterminately selected angle constantly fixed in a manner to be later described. A carriage 29 is slidably mounted for reciprocatory movement upon the beam 25 and has secured thereto a saw 30 adapted to produce a cut upon the wet sheet material when moved in one direction by the carriage and to be returned in inoperative position after having made its cut.

The construction of the beam 25 and carriage 29 are more clearly illustrated in detail in Figs. 4 and 5 and consequently reference should be made thereto for a clearer understanding of the construction. The beam 25 comprises a pair of side members 31 substantially rectangular in cross section extending parallel with each other and held in spaced relation by a bottom plate 32 which is bolted or otherwise secured to the lower edges thereof. End members 33 are secured to the opposite ends of the side members 31 to provide a rigid structure. Grooves 34 are provided in the upper surfaces of the side members 31 and extend longitudinally substantially throughout their lengths and cooperate with correspondingly shaped extensions or guides 35 formed upon the under side of a top plate 36 of the carriage 29 to thereby guide the carriage in its reciprocatory movement upon the beam 25.

The side members 31 are further provided upon their adjacent surfaces with longitudinally extending pockets or grooves 37 adjacent their midsections to substantially lighten the beam 25. Above and below the grooves 37 and in the adjacent faces of the side members 31 are pairs of upper and lower T-shaped slots 38 and 39 respectively forming continuous chambers within which sprocket chains 40 and 41 are movably supported respectively. Adjacent one end of the beam 25 a pair of sprocket wheels 42 are rotatably mounted and being in alignment with the chains 40 and 41 respectively support the chains at this point. At the opposite end of the beam 25 a pair of sprocket wheels 43 are rotatably supported on a transversely extending shaft 44 and being in alignment with the opposite ends of the chains 40 and 41 support the chains at this end. These chambers formed by the T-shaped slots 38 and 39 are adapted to contain a suitable lubricant for the sprocket chains to insure their efficient operation.

Guide or track members 45 are secured within grooves to the outer side faces of the side members 31 and extend longitudinally and in alignment along the beam 25 as shown in Fig. 2 terminating short of the opposite ends of the beam. Spaced below and secured in a like manner are guide or track members 46 which extend parallel with the track or guide members 45 and have one of their ends terminating short of the adjacent end of the beam 25 but beyond the adjacent ends of the tracks 45. The opposite ends of the tracks 46 are turned upwardly at 47 the ends being spaced apart from the adjacent ends of the tracks 45 for a purpose to be later described. The ends of the tracks 45 opposite to the ends adjacent the upward extension 47 have pivotally connected thereto fingers 48 which normally engage the upper surface of the lower tracks 46.

As already explained the carriage 29 is reciprocally movable upon the beam 25 and guided in its movement by means of the cooperating grooves 34 and extensions 35. Any suitable means may be employed for moving the carriage back and forth along the beam but herein has been disclosed the preferred manner of so doing which includes the sprocket chains 40 and 41 already referred to. The top plate 36 has a member 49 bolted or otherwise secured to the under side thereof adjacent the longitudinal center and extending downwardly a sufficient distance between the adjacent faces of the side members 31 as clearly shown in Fig. 4. A connecting link 50 has one end pivotally connected at 51 to the lower end of the member 49 while the opposite end is pivotally connected at 52 to the adjacent links of the chains 40 and 41. It will therefore be readily noted, with reference to Fig. 2, that the link 50 being connected between the sprocket chains 40 and 41 and to the carriage 29 will impart movement to the latter when the chain is suitably driven. Also the connection between the end of the connecting rod 50 and the chains 40 and 41 will travel along with the lower portion of the chain when the carriage is moved in one direction and with the upper portion of the chain when the carriage is moved in the opposite direction, the mounting of the sprocket wheels 42 and 43 being such as to permit the connection referred to to travel from the lower path of the chain to the upper path of the chain with the result that the connecting rod 50 is pushing the carriage in one movement and pulling the carriage in its opposite movement.

It being one of the functions of the present machine to maintain the saw in engagement with the wet sheet material during the cutting operation and out of engagement with the wet sheet material on its return movement after the cut has been made, it is necessary that the saw support which is mounted upon the carriage be maintained in its lowered or saw cutting position during the cutting operation and in an elevated position during its inoperative condition. This saw support is shown at 53 and comprises a plate which has secured at its four corners upwardly extending rods or posts 54 which are slidably mounted in lugs 55 formed upon the inner lower faces of the side plates 56 of the carriage 29. These side plates 56 are secured by means of bolts along their upper edges to the top plate 36 and together therewith form a substantially inverted U-shaped enclosure which extends about the adjacent portion of the beam 25. The rods or posts 54 extend through suitable openings 57 in the top plate 36 and are mounted for slidable engagement therein. The upper ends of the posts 54 have connected thereto a spider 58 which connects the ends of the posts together and are held in place by means of nuts 59 adapted to engage the screw threaded ends of the posts to thereby insure uniform movement of the motor supporting plate 53.

The side plates 56 have secured upon their inner faces at 60 rollers 61 which are disposed beneath the tracks 46 and are adapted to engage the under surfaces of the tracks 46 throughout the movement of the carriage 29 to thus prevent relative vertical movement between the carriage 29 and the beam 25. A pair of members 62 are slidably mounted in vertically extending slots 63 provided in the upper portions of the side plates 56 and aligned slots 64 in the top plate 36 and have their upper ends connected by a cross bar 65 rigidly held in place by nuts 66 to insure that the members 62 are moved in unison. The lower ends of the members 62 have secured at 67 rollers 68 which extend inwardly and are disposed in one position between the upper tracks 45 and lower tracks 46 as shown in Fig. 4 and in another position above the upper tracks 45 but in engagement therewith, this position not being shown upon the drawings, and corresponding to the position assumed when the motor supporting plate 53 is in its elevated or inoperative position.

An adjusting screw 69 is screw threadedly mounted in the spider 58 and has its lower end in engagement with the cross-bar 65. This permits for adjustment of the vertical movement of the motor supporting plate 53 and may be locked in the desired position by means of a lock nut 70.

It will therefore be readily understood that during the cutting operation of the saw the latter will be held in contact with the wet sheet material throughout the movement of the carriage 29 by virtue of the engagement between the rollers 68 and the under surfaces of the upper tracks 45 thereby preventing any appreciable vertical movement of the cross-bar 65 and consequently the motor supporting plate 53. As the cutting operation is completed the rollers 68 are moved past the fingers 48 and when completely beyond the fingers are adapted to drop back into the position shown in Fig. 2 so that upon reverse movement of the carriage the rollers 68 ride up the inclined surfaces of the fingers 48 and onto the upper surfaces of the upper track 45, thus elevating the motor supporting plate 53 and maintaining the same in elevated position until the carriage is returned to its initial position. At this point the rollers 68 pass through the space between the upturned extensions 17 on the lower tracks 46 and the adjacent ends of the upper tracks 45, sufficient clearance having been provided to permit these rollers to pass therethrough wherein the rollers 68 drop into the space between the upper tracks 45 and lower tracks 46 as shown in Fig. 4. This permits lowering of the motor supporting plate into a position in which the saw is again ready to perform its cutting operation.

Any suitable means may be employed for driving the sprocket chains 40 and 41, but in the present instance a preferred driving arrangement is illustrated. A sprocket wheel 71 is fixedly secured to a shaft 72 rotatably mounted in a bearing 73 secured to the upper surface of the beam support 28. The inner end of the shaft 72 is fixedly connected to one portion of a magnetic clutch 74 so as to be rotatable with the shaft 72. The cooperating portion of the clutch 74 is mounted upon a shaft 75 which is rotatably journaled in a pair of spaced bearings 76 secured to the upper surface of the beam support 28. This shaft 75 has secured thereto between the pair of bearings 76 a gear 77 which meshes with a gear 78 secured to the lower end of a vertically extending shaft 79. This vertically extending shaft 79 is suitably journaled at 80 within the upright 27 and also has its upper end journaled in a bearing 81 secured within the beam 25. The shaft 79 adjacent its upper end is provided with a gear 82 which meshes with a gear 83 secured to a transversely extending shaft 84 which has its opposite ends journaled in the side members 31 and extending beyond the same. The extended ends of the shaft 84 have secured thereto gears 85 which constantly mesh with gears 86 secured to the extended ends of the shaft 44. As the sprocket wheels 43 are also mounted on the transverse shaft 44 it will be evident that movement of the sprocket chains is obtained through the clutch drive just described.

It is not believed necessary to describe in detail a magnetic clutch such as shown at 74 as any type of magnetic clutch may be employed, but it will suffice to say that by energizing the coils of one of the driving portions of the clutch the other driving portion is brought into engagement therewith and a positive drive established therethrough. Interruption of the energizing circuit likewise deenergizes the coils and causes the driving portions of the clutch to become disengaged and the drive therethrough interrupted.

In order to insure that the carriage 29 is moved along the beam 25 in a definite relation to the speed of the wet sheet material being fed onto the rollers 11 the sprocket wheel 71 is connected to a sprocket wheel 87 in turn driven from the material feed driving mechanism of the material forming machine. This connection is quite important as it positively maintains the proper ratio between the speed of the saw during its cutting operation and the speed of the material being cut so that the angle of the beam 25 may at all times remain fixed after the installation of the apparatus.

A saw motor 88 is rigidly secured to the under side of the motor supporting plate 53 and mounted upon the armature shaft 89 is a rotatable saw 90 in the form of a disc. This motor may be electrically connected in a suitable circuit for operating the motor continuously or intermittently as desired, the important feature being to rotate the saw 90 during the cutting operation. A shoe 91 shown in detail in Figs. 5 and 6 is normally positioned below the lower portion of the saw 90 and is provided with a longitudinally extending slot 92 within which the lower portion of the saw 90 is disposed, the cutting edge of the saw 90 being somewhat below the upper surface of the shoe for a purpose to be later described. The rear end of the shoe 91 is provided with an upwardly extending arm 93 which has its upper end adjustably connected at 94 with the motor supporting plate 53, this adjustment permitting relative movement between the lower edge of the saw 90 and the shoe.

Two of the rollers 11 on opposite sides of the saw 90, when in its initial cutting position as shown in Fig. 1, are provided with warping collars 95 which taper outwardly toward the end of the rollers and are positioned to underlie the edge of the wet sheet material. These warping collars engage the sheet material and tend to sufficiently raise the edge thereof to permit the shoe 91 to pass thereunder as clearly shown in Fig. 6. Thus is the sheet material supported upon the shoe 91 during the cutting operation to thereby permit a diagonal movement of the saw and shoe above the rollers 11 and at the same time produce a transverse cut which is substantially at right angles to the edges of the material. Also the position of the shoe 91 affords sufficient support for the wet sheet material during the cutting operation and as the lower edge of the saw 90 is normally below the upper surface of the shoe 91 a clean and complete cut is afforded.

The circuit for energizing the coils of the magnetic cut 74 preferably includes a switch mechanism operable intermittently and actuated by the leading end of the sheet material. Reference should be had to Figs. 1 and 3 wherein this operating mechanism is shown as comprising a bar 96 which is mounted upon or is part of the tipple apparatus 97 shown in dotted lines. This tipple it should be understood is nothing more than a conveyor for conveying the cut lengths of material away from the saw after the material has been cut, and usually to the drier. A bracket 98 is slidably mounted upon the bar 96 and provided with suitable means for locking the same in any desired position. This bracket has pivotally connected thereto a rod 99 which extends inwardly and has fixed to its free end a depending finger 100 which is normally depending and disposed so as to be engaged and moved by the leading edge of the sheet material. When the leading edge of the sheet material engages the depending finger 100 the rod 99 is moved about its axis and actuates a switch which energizes the coils of the magnetic clutch 74 to establish a positive drive between the sprocket wheel 71 and the carriage 29. This positive drive is continued throughout the cutting operation and the return of the carriage to its initial starting position at which time it may engage a normally closed switch in the magnetic clutch circuit for interrupting the circuit and deenergizing the coils to interrupt the drive. It should of course be understood that the conveyor or tipple 97 is operated at a more rapid speed than the speed at which the material is fed onto the saw table and consequently there is a separation between the edges of the material which were previously severed so as to permit the finger 100 to return to its normal position.

It is to be noted that certain of the rollers 11 are driven as previously mentioned and the driven rollers should include those within the limits of the saw travel so that the material is positively moved during the cutting operation. These rollers receive their power by means of a sprocket wheel 101 secured to the journal of the end roller and receive a sprocket chain 102 which has its other end engaging a sprocket wheel 103. The sprocket wheel 103 is secured to a shaft which has its ends journaled in bearings 104 supported upon the plate 23. This shaft also has secured thereto a second sprocket wheel 105 which supports one end of a sprocket chain 106 secured to any suitable driving means such as the mechanism operating the tipple 97 if desired.

The operation of the wet saw is as follows. The wet sheet material 12 is continuously fed from a forming machine onto the rollers 11 of the saw table 10 and the leading edge of the sheet in its travel engages the warping collars 95 which tends to raise the adjacent edge of the sheet material to such an extent as to permit the shoe 91 to pass thereunder and rigidly support the sheet during the cutting operation. As the leading edge of the sheet passes from the saw table onto the tipple 97 it engages the switch finger 100 and closes the circuit to the magnetic clutch 74 thus energizing the coils and establishing a drive connection therethrough from the sprocket wheel 71 which is constantly driven from the material forming apparatus driving mechanism. This causes the carriage 29 to be driven through the train of gears and sprocket chains within the beam 25 and as a result is moved across the beam carrying the saw with it. The saw motor 88 having been previously started the saw 90 effects a transverse cut of the sheet material substantially at right angles to the edges of the sheet in its diagonal movement across the saw table 10 without interrupting the travel of the sheet material 12. When the saw has completed its cut it reaches a position indicated by dotted lines at 106 and the rollers 68 move upwardly on the fingers 48 and onto the upper track or guide 45 as the carriage 29 is being returned to its initial position thus raising the motor and shoe out of engagement with the material 12 during its return movement. As the carriage 29 returns to its initial position it engages a normally closed switch of any desired type which is in the energizing circuit of the magnetic clutch 74 and thus interrupts the circuit thereby rendering the drive through the magnetic clutch inoperative. The saw 90 is then ready to make its next cut and the cycle of operations will be continued as soon as the leading edge of the sheet material again engages the switch finger 100.

If it happens that a portion of the sheet material is defective and cannot be used this portion may be cut off by manual operation of the switch finger 100 for moving the saw 90 whenever desired, also the section of defective material cut off from the continuous feed sheet is fed below the saw table 10 by operation of the hand lever 21 which moves the two rollers 18 downwardly and permits the leading edge of the defective section to pass beneath the adjacent rollers 11. When this section has been discharged the rollers are then raised into alignment with the saw table rollers 11 and the cutting operation is continued.

While I have described the preferred embodiment of the invention it is to be understood that I am not to be limited thereto inasmuch as changes and modifications may be resorted to without departing from the spirit of the invention as defined in the appended claims.

Having thus described my invention I claim:

1. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, and driving means operatively connected with said first mentioned means for moving said tool at a predetermined speed with respect to the speed of the material.

2. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, and driving means operatively connected with said first mentioned means for moving said tool at a predetermined speed with respect to the speed of the material during the cutting operation and for returning the tool to its initial position.

3. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, driving means operatively connected with said first mentioned means for moving said tool at a speed in relation to the speed of the material during the cutting operation and for returning the tool to its initial position, and means for maintaining said tool in engagement with the material during the cutting operation.

4. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, driving means operatively connected with said first mentioned means for moving said tool at a speed in relation to the speed of the material during the cutting operation and for returning the tool to its initial position, and means for maintaining said tool in engagement with the material during the cutting operation and for maintaining said tool out of engagement with the material during its return to its initial position.

5. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, driving means operatively connected with said first mentioned means for moving said tool at a predetermined speed with respect to the speed of the material, and means operable by the sheet material for actuating said driving means.

6. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, means for reciprocating said tool, and driving means for said last mentioned means operatively connected with the sheet material moving means.

7. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, means for reciprocating said tool, and driving means for said last mentioned means operatively connected with the sheet material moving means including a clutch.

8. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, means for reciprocating said tool, and driving means for said last mentioned means operatively connected with the sheet material moving means including a clutch, and means operable by said sheet material for actuating said clutch.

9. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, a member movable with said tool and engageable with the under surface of the sheet material during the cutting operation, and driving means operatively connected with said first mentioned means for moving said tool at a speed in relation to the speed of the sheet material.

10. In a cutting apparatus, a support for sheet material, means for moving said material at a constant speed thereover, a cutting tool diagonally movable across and mounted above said support, said tool being adapted to effect a transverse cut upon the material substantially at right angles to the edges thereof, a member movable with said tool and engageable with the under surface of the sheet material during the cutting operation, means engageable with the sheet material adjacent said tool to raise the material above said member, and driving means operatively connected with said first mentioned means for moving said tool at a speed in relation to the speed of said sheet material.

11. In a cutting apparatus, a material supporting table including a plurality of longitudinally spaced rollers, a beam extending diagonally across and mounted above said rollers, a cutting tool reciprocally mounted on said beam, and means for driving the rollers within the extremities of the cutting tool travel.

12. In a cutting apparatus, a material supporting table including a plurality of longitudinally spaced rollers, a beam extending diagonally across and mounted above said table, a cutting tool reciprocally mounted on said beam, and means on certain of said rollers adjacent the initial position of said cutting tool adapted to raise the edge of the material upon engagement therewith.

13. In a cutting apparatus, a material supporting table including a plurality of longitudinally spaced rollers, a beam extending diagonally across and mounted above said table, a cutting tool reciprocally mounted on said beam, and means associated with at least two of said rollers for moving the latter out of the normal plane of said rollers to provide a gap.

RICHARD C. MOORE.